May 11, 1943.    W. A. BRUCE    2,318,667
METHOD FOR TESTING WELD JOINTS
Filed Feb. 23, 1942
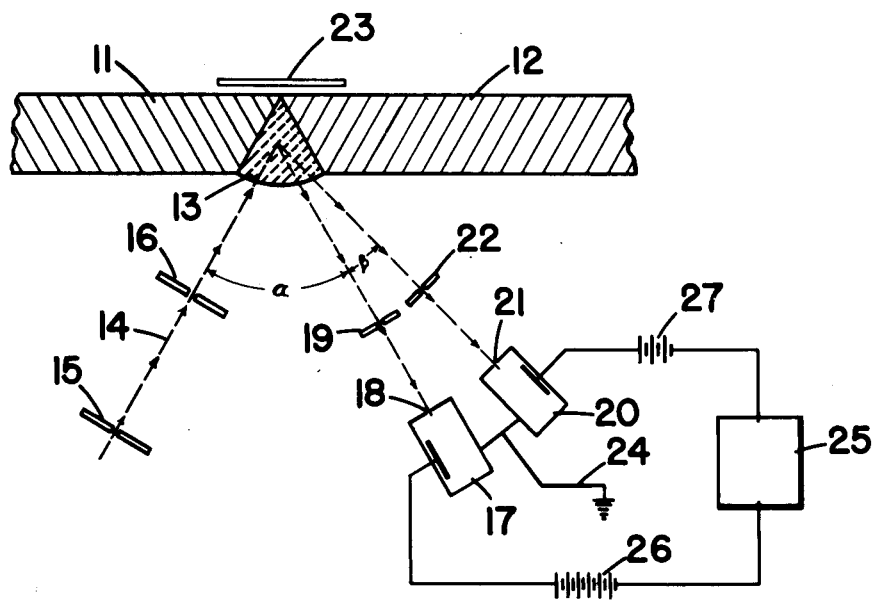
William A. Bruce INVENTOR.
BY J D McKean
ATTORNEY Patented May 11, 1943

2,318,667

UNITED STATES PATENT OFFICE 2,318,667

METHOD FOR TESTING WELD JOINTS

William A. Bruce, Tulsa, Okla., assignor to Standard Oil Development Company, a corporation of Delaware Application February 23, 1942, Serial No. 432,033

2 Claims. (Cl. 250—83.6)

The present invention is directed to a method of testing a weld joint.

In the welding art it is often necessary for the freshly welded joint to be quenched as soon as possible without reducing the strength of the joint. This speed is necessary in order to justify the employment of welding on many jobs as, for example, oil well casing. On many occasions, it is desirable not only to determine when the weld is in condition for quenching, but also to make a permanent record which will indicate the quality of the weld.

It is an object of the present invention to devise a method for determining when a newly completed weld may be safely quenched.

It is a further object of the present invention to devise a method of recording the quality of a weld and simultaneously therewith obtaining an indication as to the earliest moment it is safe to quench it.

Other objects and advantages of the present invention may be seen from the following description taken in conjunction with the drawing in which the sole figure is a diagrammatic view illustrating the practice of the present invention.

In the drawing, numerals 11 and 12 indicate pieces of steel fastened together by weld 13. Immediately upon the completion of the weld a beam of monochromatic X-rays, the path of which is indicated by numeral 14, is focused on the weld. Screens 15 and 16 aid in focusing the X-rays. An ionization chamber 17 provided with a window 18 and a second similar ionization chamber 20 having a window 21 are set up adjacent the weld. Slotted screen 19 is arranged to define a path to chamber 17, and a similar screen 22 is arranged to define a path to chamber 20. Beam 14, ionization cells 17 and 20, and weld 13 are carefully arranged to have a specific relation with one another.

As the beam of monochromatic X-rays falls on the metal of the weld, the beam will be refracted in all directions. The most powerful refraction will be the first order Bragg angle. As austenite has a face-centered cubic system and pearlite a body-centered cubic system, the first order Bragg angle is different for these two materials. In the drawing, the first order Bragg angle obtained by reflection of the monochromatic beam 14 from austenite is designated by angle $\alpha$ and the first order Bragg angle for pearlite by angle $\alpha+\beta$.

Ionization chamber 17 is arranged so that the beam, as reflected through angle $\alpha$, will fall on window 18. Ionization chamber 20 is arranged so that the beam, as reflected through angle $\alpha+\beta$, will fall on window 21. It will be understood that mechanical means for retaining the ionization cells in position with respect to the monochromatic X-rays and the weld has not been shown in the drawing, which is intended to be merely diagrammatic.

It is often desirable to obtain a permanent record indicating the quality of the weld immediately on its completion. For example, if the weld joins together joints of pipe comprising a drill stem, it is essential that the strength of the weld be as great as possible, and that a record be obtained soon after the weld is completed. It will usually be desirable to arrange film 23 back of the weld, immediately after the welding step is completed, so that the X-rays will pass through the weld and fall on the film simultaneously with the determination of the change in state of the metal from the austenite to a pearlite condition. By the employment of this technique a photograph of the weld indicating imperfections, such as blow holes, may be obtained simultaneously with the determination of the earliest time at which the weld may be quenched.

Ionization chambers and their use are well known to the art. They may be employed in accordance with good electrical practice. I prefer to ground the shell of the chambers to a common ground 24 and to lead the output of the electrodes of chambers 17 and 20 into an amplifier indicator 25. Battery 26 is connected between the amplifier indicator and cell 17 to maintain the electrode positive, and similarly a battery 27 is arranged between cell 20 and the amplifier indicator 25 to keep this electrode positive.

In practicing the method of the present invention, the X-ray beam is focused on the weld immediately upon the completion of the welding operation. At this time, the metal of the weld will be principally in the austenite form, and hence, ionization chamber 17 will be much more highly activated than chamber 20. It is preferred that the amplifier indicator be in a balanced condition under these circumstances. As the metal in the weld is allowed to cool, it changes from austenite to pearlite, and this change causes the refracted beam to shift from ionization chamber 17 to ionization chamber 20 and is indicated to the operator by amplifier indicator 25. When the shift from austenite to pearlite is sufficiently advanced, as has been determined experimentally, the weld is quenched without damage thereto.

As stated previously, it will generally be desirable to obtain a permanent record indicating the quality of the weld at the same time the change in the state of the metal is being determined. Accordingly, film 23 is placed in position behind the weld before it is exposed to the beam of X-rays in order to obtain a photograph of the weld. This photograph will disclose blow holes and other irregularities which may be present in the weld.

The nature and objects of the present invention having been thus described and illustrated, what is claimed as new and useful and is desired to be secured by Letters Patent is:

1. In the cooling of a weld joint the steps of exposing said joint to a beam of X-rays while the metal is still substantially at welding temperatures, cooling the joint while observing the shift in the first order reflection of the X-rays as the metal changes from an austenite to a pearlite condition, and quenching the joint when the change is substantially complete.

2. In the cooling of a weld joint the steps of exposing said joint to a beam of monochromatic X-rays while the metal is still substantially at welding temperatures, cooling the joint at a relatively slow rate while simultaneously observing the shift of the first order reflection of the X-rays as the metal changes from an austenite to a pearlite condition, and quenching the joint when the change is substantially complete.

WILLIAM A. BRUCE.